United States Patent [19]

Scarnato et al.

[11] 3,786,620
[45] Jan. 22, 1974

[54] BALANCED MOWER

[75] Inventors: Thomas J. Scarnato, Barrington; Paul C. Gordon, Hinsdale; Robert Sorensen, Glen Ellyn; Craig M. Lawler, Downers Grove, all of Ill.

[73] Assignee: International Harvester Company, Chicago, Ill.

[22] Filed: May 19, 1972

[21] Appl. No.: 254,979

[52] U.S. Cl.................. 56/16.3, 56/296, 74/461
[51] Int. Cl................. A01d 35/08, A01d 55/02
[58] Field of Search ... 56/296, 297, 306, 16.2, 10.2, 56/16.3, 10.4, 14.9; 74/603, 604, 590, 591, 443, 444, DIG. 10, 445

[56] References Cited
UNITED STATES PATENTS

| | | | |
|---|---|---|---|
| 2,745,238 | 5/1956 | Hopkins | 56/296 |
| 2,790,295 | 4/1957 | Collins | 56/296 |
| 2,942,483 | 6/1960 | Evans et al. | 74/40 |
| 2,857,777 | 10/1958 | Porter | 74/432 |
| 3,241,391 | 3/1966 | Borro, Sr. et al. | 74/445 |
| 2,580,266 | 12/1951 | Abgarian | 56/10.4 |
| 3,234,718 | 2/1966 | Wathen | 56/10.9 |
| 2,827,753 | 3/1958 | Collins | 56/296 |
| 3,000,226 | 9/1961 | Muehlhausen | 56/296 X |

FOREIGN PATENTS OR APPLICATIONS 948,341  1/1964  Great Britain ............... 74/461

Primary Examiner—Russell R. Kinsey
Attorney, Agent, or Firm—Dennis K. Sullivan; Floyd B. Harman

[57] ABSTRACT

A mower having a stationary cutter bar and a sickle reciprocal thereon, and a drive which comprises a pitman connected to the sickel and driven by a crank which has a counterweight. The crank is connected by a flexible, preferably nylon, gear assembly to a counterbalancing counterweight. Both counterweights are arranged in a meshing relation and in planes parallel to the longitudinal axis of the sickle. Certain force couples and unbalancing forces are modulated by deflection of the plastic gear teeth.

9 Claims, 9 Drawing Figures

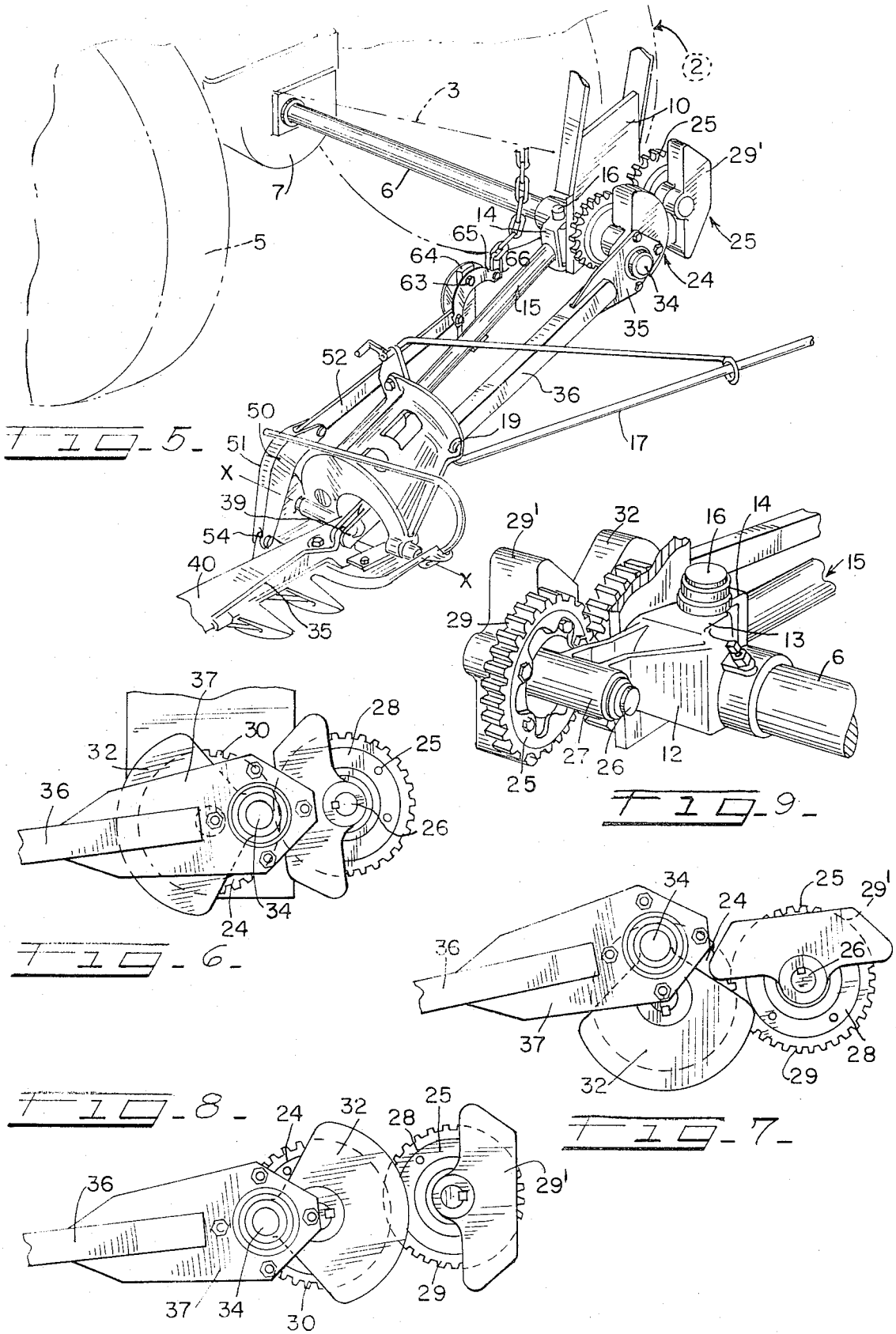

BALANCED MOWER

DISCUSSION OF THE PRIOR ART

In prior art devices the accepted arrangement for driving a pitman and sickle, is to provide a counterbalancing weight on the crank wheel opposite the crank pin. This type of arrangement counterbalances the inertia forces of the sickle at each end of the stroke of the sickle, and the system is unbalanced at all angles except for where the weight is in opposition to the sickle. There are systems which employ oppositely rotating counterweights but these weights are displaced laterally of the sickle and require a complicated drive linkage or if driven by gears, such gears are metalic and non-yielding. None of these arrangements utilize flexible gear teeth to modulate the unbalancing forces.

SUMMARY OF THE INVENTION

This invention is concerned with a novel drive for a pitman type mower.

A specific object is to provide a drive wherein the parts are oriented in a novel compact arrangement and wherein they cooperated in an effective manner to essentially counterbalance unbalancing forces such as cause excessive destructive vibrations.

The invention comprehends a drive for a mower which incorporates a pair of counterrotating elements which are interconnected by a resilient drive couple.

These and other objects and advantages inherent in and encompassed by the invention will become more readily apparent from the specifications and the drawings, wherein:

FIG. 5 is a perspective front view of the tractor and mower assembly;

FIG. 6 is a side elevational view of the drive mechanism at the inward stroke end of the sickle;

FIG. 7 is a side elevational view of the drive between the stroke ends of the sickle;

FIG. 8 shows the position of the drive mechanism at the outward stroke end of the sickle; and FIG. 9 is a rear perspective view of the drive mechanism and mounting therefor.

DESCRIPTION OF THE INVENTION

Figure 1:
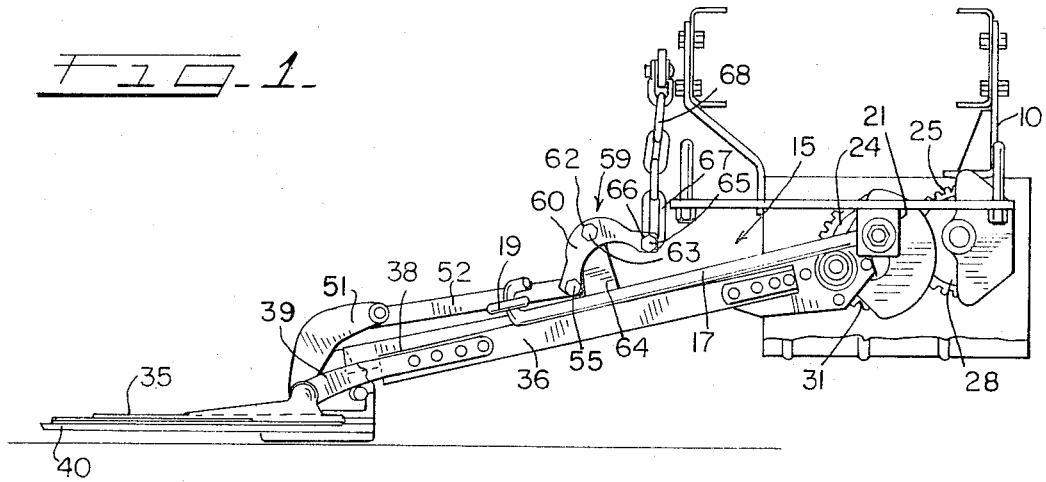
FIG. 1 is a front view of a mower and tractor assembly shown in outline form incorporating the invention.
Figure 2:
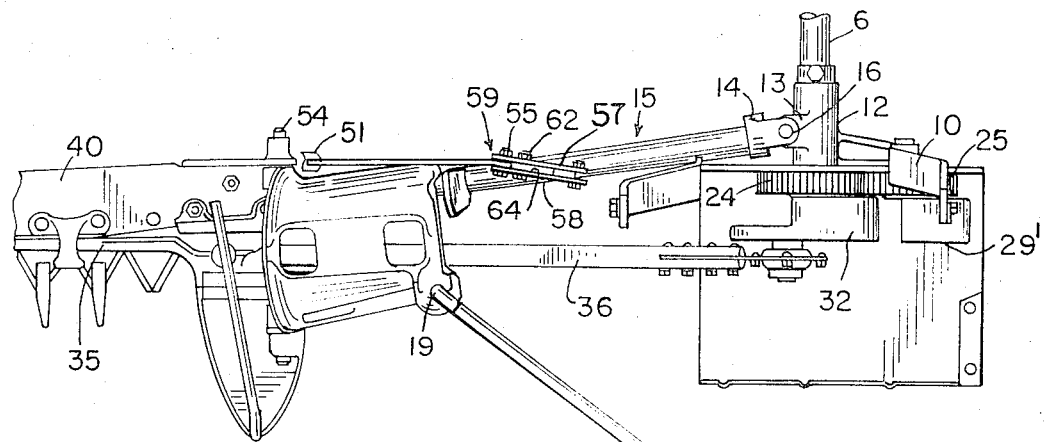
FIG. 2 is a fragmentary top view of the mower assembly.
Figure 2:
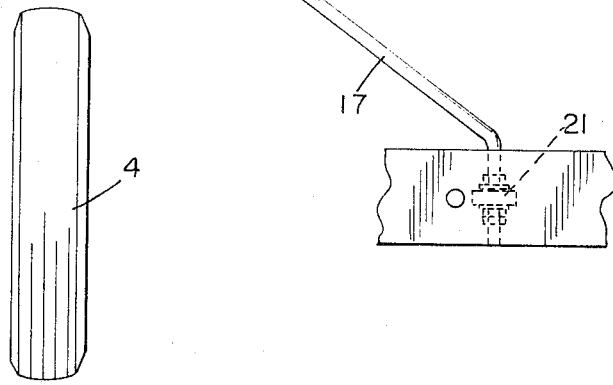
Figure 3:
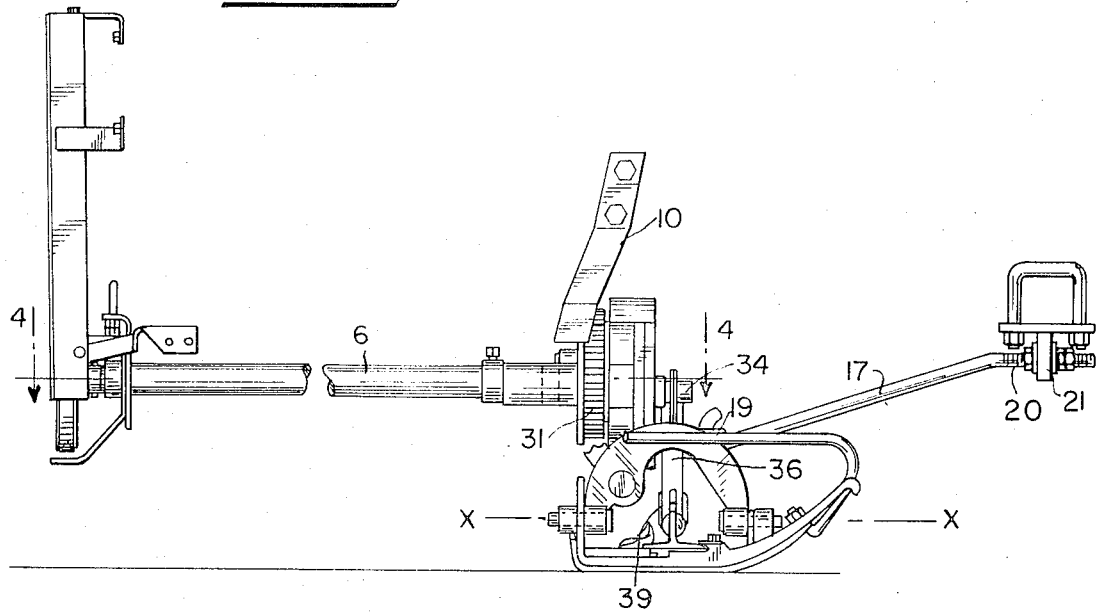
FIG. 3 is an end view of the mower assembly.
Figure 4:
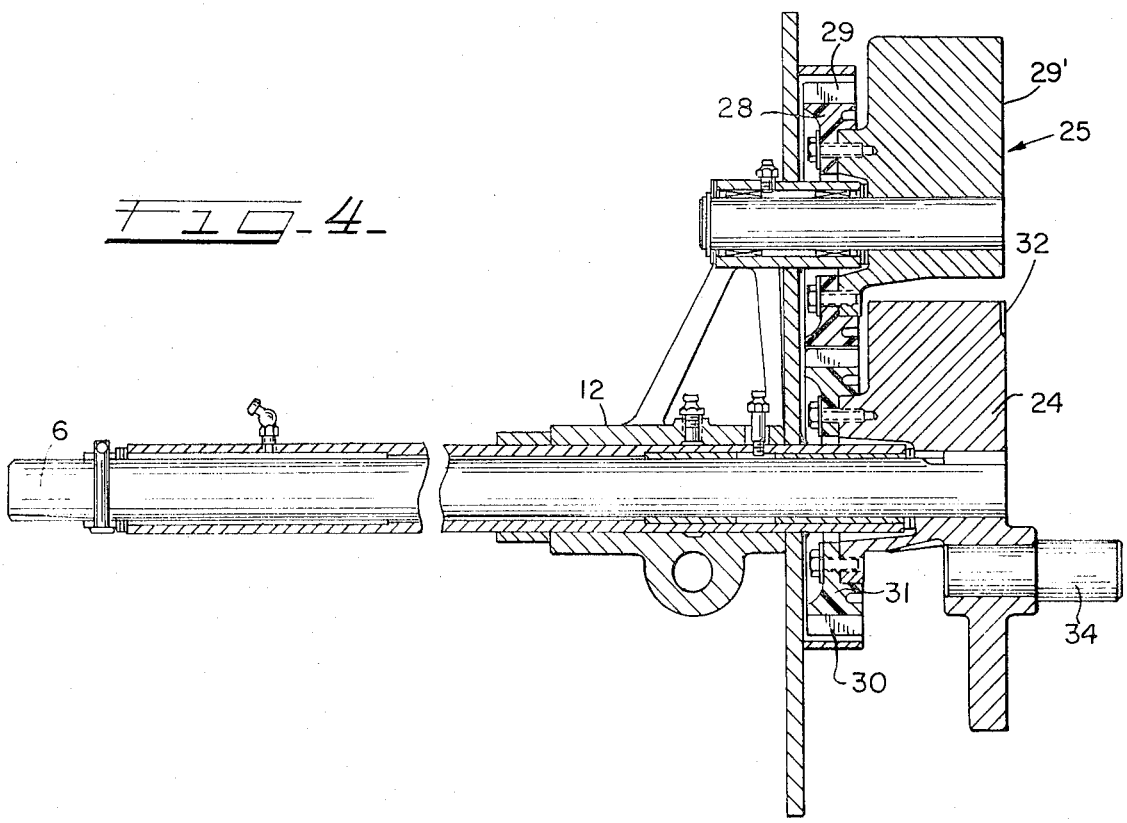
FIG. 4 is an enlarged longitudinal sectional view taken substantially on line 4—4 of FIG. 3.

The invention is shown in association with a tractor generally designated 2 comprising a longitudinal body 3 and front and rear wheel and axle assemblies 4 and 5.

The tractor body houses a transmission power transfer gear train connected to a generally horizontal output shaft 6 which extends forwardly beneath the body from a gear or pulley case 7 at the rear of the body to adjacent the forward end of the body and at its forward end is journaled to a support structure 10 which is secured in depending position from the body.

Part of this support is a casting designated 12 which at one end 13 fits into a jaw 14 provided at the inner end of a coupling frame 15. An upright pin 16 secures the jaw with the frame so that the frame is movable forwardly and rearwardly between the front and rear wheel assemblies. The adjustment of the position of the coupling frame is affected by a stay rod 17 which at its rear end is hooked at 19 to the outer end of the coupling frame and is angled toward the tractor forwardly and at its forward end is threaded at 20 and extends through a support 21 mounted beneath the tractor adjacent to its front end. A pair of nuts are threaded on end 20 and are suitably tightened against opposite sides of the support 21.

A pair of counterrotating drive members 24, 25 are located in front of the support structure 10. The member 25 comprises a shaft 26 which is rotatably mounted in a journal 27 on the casting 12 on a generally horizontal axis parallel with the power output shaft 6 and at the side thereof opposite the coupling frame. The shaft 26 is keyed to a counterweight 29' to which a gear 28 is bolted. The gear 28 has teeth 29 made of plastic, deformable material preferably nylon or the like. Teeth 29 mesh with teeth 30 also of like material on a gear 31 which is bolted to a counterweight 32 which is keyed to shaft 6. The counterweight 32 is disposed at one side of the axis of rotation of shaft 6 and at the opposite side of said axis of shaft 6. The counterweight 32 has a crank 34 connected thereto extending parallel with shaft 6.

It will be noted that the counterweights 29 and 32 are essentially half-moon designs and intercollate with each other during rotation and are located in a common vertical plane parallel with the sickle 35 at one side of a pitman 36 which operates in a vertical plane parallel with the plane of operation of the counterweights.

The pitman 36 has one end 37 journaled to the crank 34 and at its other end 38 is connected by a universal coupling 39 to the sickle 35 for reciprocating the same upon the mower bar 40 which is pivotally connected on a fore and aft extending axis X—X to the outer end of the coupling frame. Now it will be noted that adjustment of the stay rod or bar 17 is effected to position the pitman 36 and sickle 35 in longitudinal alignment and parallel with the plane of operation of the counterrotating and counterbalancing drive members. The location of these drive members 24, 25 in a vertical plane maintains the counterbalance of the sickle even though it is gagged by tilting upwardly about the axis X—X when the gag and lifting linkage 50 is actuated.

This linkage 50 comprises a pair of pivotally interconnected links 51 and 52, the link 51 being curved and having its lower end pivotally connected as at 54 to the mower bar outwardly of the axis X—X. The link 52 is pivotally connected by pin 55 to the lower ends of a pair of identical complementary side by side arranged sections 57,58 of a bell crank lever 59. The elbow 60 of the lever 59 is pivoted at 62 on a pin 63 at the upper end of an upright support lug 64. The sections 57, 58 are interconnected at their other ends 65 by a pint 66 which holds a lower chain loop 67 of chain 68 between sections.

The chain 68 is suitably connected either to a manual, hydraulic or other actuator (not shown) as well known, which is adapted to lift the chain and rotate the lever 59 in a counterclockwise direction. This pivots the mower upwardly about axis X—X to gag position until the pin 55 engages the adjacent edge 70 of the support lug 64. Then the coupling frame is bodily raised upwardly with the mower to clear obstructions and the like.

It will be appreciated that in view of the foregoing disclosure, various other forms of the invention will become readily apparent which would fall within the scope of the appended claims.

What is claimed is:

1. In a mower of the type having a cutter bar and a sickle reciprocal thereon, means for driving the sickle comprising a pitman connected at one end to the sickle, a pair of counterrotating balancing elements, only one of which has a crank connection with the end of the pitman for driving said pitman, a counterweight on each element, said counterweights being disposed in a common vertical plane parallel with said sickle and gear means drivingly interconnecting said elements for rotating said counterweights in phased relation in opposition to the mass of the sickle at each end of its stroke and in counterbalancing relation to each other during the interval between the ends of each stroke, at least one of said gear means comprising plastic teeth characterized by being deflectible and effective to modulate force couples generated between said counterweights.

2. The invention according to claim 1 wherein both of said gear means comprise plastic teeth of the character described.

3. The invention according to claim 1 wherein said teeth are formed of nylon.

4. The invention according to claim 1 and said each counterweight located on one side of the axis of rotation of its respective element.

5. In a mower for a tractor of the type having front and rear wheels and an intervening longitudinally extending body, a support suspended beneath said body, a power input shaft journaled from said support, a rotary drive element connected to said shaft for rotation in a vertical plane, said element having a crank at one side of its axis of rotation and a counterweight on the other side of said axis, a coupling arm having one end pivotally connected to said support for swinging movement about an upright axis, a mower connected to the other end of the coupling frame and comprising a mower bar and a sickle reciprocal thereon, a stay rod adjustably connected at one end to the tractor and at its other end to the coupling frame, a single pitman connected at one end to said crank and at the other end to said sickle, a counterbalancing element journaled for rotation in a vertical plane on the support and having a counterweight at one side of its axis of rotation, gear means interconnecting said elements for driving said counterweights in predetermined phase relation, said stay rod being adjustable to swing said coupling frame and said mower transversely of said pitman for alignment of the sickle therewith longitudinally and parallel to said vertical planes of said elements.

6. The invention according to claim 5 and said gear means being formed of deformable yielding material for modulating the effects of said counterweights.

7. The invention according to claim 6 and said counterweights disposed in interfitting relation in substantially common vertical plane substantially parallel with the plane of operation of the pitman.

8. The invention according to claim 7 and said counterweights phased to additively oppose the mass of the sickle and pitman at each end of the stroke of the sickle and to counterbalance each other in the interval between said ends of the stroke.

9. A mower comprising a cutter bar and a sickle reciprocal thereon, means for reciprocating and counterbalancing said sickle comprising a pair of counterrotating elements mounted to rotate on generally horizontal parallel axes and having counterweights, said counterweights disposed in close coupled interfitting relation in a common vertical plane substantially parallel to said sickle, gear means mounted to each respective element and having meshing relation for driving said elements and phasing said counterweights to oppose the inertia of the sickle at each end of its stroke and counterbalancing each other at all other angular displacements, and said gear means being formed of deflectible, non-metallic material adapted to temporarily yield under the influence of the inertia forces developed in the elements so as to modulate these forces.

* * * * *